United States Patent [19]

Hunter et al.

[11] Patent Number: 5,732,766

[45] Date of Patent: Mar. 31, 1998

[54] METHOD AND APPARATUS FOR THE TREATMENT OF GAS STREAMS

[75] Inventors: George Sherwood Hunter, Richmond; John Leslie Oakton, Saltburn; Alex George Hunter, Catterick, all of Great Britain

[73] Assignee: Process Scientific Innovations Limited, Durham, Great Britain

[21] Appl. No.: 302,772

[22] PCT Filed: Mar. 17, 1993

[86] PCT No.: PCT/GB93/00552

§ 371 Date: Nov. 22, 1994

§ 102(e) Date: Nov. 22, 1994

[87] PCT Pub. No.: WO93/18843

PCT Pub. Date: Sep. 30, 1994

[30] Foreign Application Priority Data

Mar. 17, 1992 [GB] United Kingdom ............... 9205900

[51] Int. Cl.⁶ .................................................... F28B 9/10

[52] U.S. Cl. ........................ 165/111; 165/112; 165/113; 62/86; 62/401; 95/288

[58] Field of Search .......................... 165/111, 112, 165/113; 62/401, 475, 86; 95/273, 288

[56] References Cited

U.S. PATENT DOCUMENTS

| | | | |
|---|---|---|---|
| 2,011,100 | 8/1935 | Woods | 62/86 X |
| 2,441,279 | 5/1948 | McCollum | 62/401 X |
| 2,616,614 | 11/1952 | Plummer, Jr. | 62/86 X |
| 3,049,891 | 8/1962 | Barkelew | 62/401 X |
| 3,765,168 | 10/1973 | Wagle | 165/111 X |
| 3,841,484 | 10/1974 | Domnick | |
| 4,255,406 | 3/1981 | Isalski et al. | 95/288 X |
| 4,333,992 | 6/1982 | Healy | 429/17 |
| 4,444,024 | 4/1984 | McFee | 62/401 |
| 4,665,714 | 5/1987 | Keller | 62/401 |
| 4,991,408 | 2/1991 | Liszka | 62/401 |

FOREIGN PATENT DOCUMENTS

| | | |
|---|---|---|
| 0 081 297 | 6/1983 | European Pat. Off. |
| 3827005 | 2/1990 | Germany. |
| 428058 | 4/1935 | United Kingdom ............ 62/401 |
| 1 236 396 | 6/1971 | United Kingdom. |
| 1 557 821 | 12/1979 | United Kingdom. |
| 1 603 519 | 11/1981 | United Kingdom. |

*Primary Examiner*—Leonard R. Leo
*Attorney, Agent, or Firm*—Oblon, Spivak, McClelland, Maier & Neustadt, P.C.

[57] ABSTRACT

Gas at elevated temperature from a compressor (50) is fed to a first cooling coil (14) and thence to a second cooling coil (18) in chamber (16). The cooled gas at line (20) enters a chamber (22) where water and oil (if present) separate. A contaminant-free stream of compressed gas is further purified at filter chambers (28, 34). A portion of the gas flow, carrying the liquefied water or water/oil mixture is returned via reducing valve (44) to the interior of chamber (16) where it travels up riser pipe (46) in heat-exchanging relationship with the gas in coil (18) and emerges through port (48) as a condensate-free gas stream, the condensate having re-volatilized after passage through the reducing valve (44). The described arrangement minimizes or eliminates watery waste and cools the gas stream without the need for a powered cooler or supply of cooling water.

31 Claims, 6 Drawing Sheets

FIG. 1
AMBIENT TEMPERATURE 21.5°C

METHOD AND APPARATUS FOR THE TREATMENT OF GAS STREAMS

TECHNICAL FIELD

This invention relates to a method and apparatus for the production of compressed air or for the treatment of gas streams at elevated temperatures to cool them to temperatures near or below ambient temperature, so that once this cooling has taken place further condensation of vapor present as a contaminant of the gas streams does not occur or does so only to a negligible extent.

BACKGROUND ART

Condensed water vapor can reduce the performance of oil removal filters, membrane filters and other fine tolerance devices. The invention is also concerned with the removal of liquid contaminant e.g. water, together with less volatile contaminants such as the oil from an oil-lubricated compressor and liquid and/or particulate contaminants from an oil-free compressor.

Relatively small on-site compressors powered by mains electricity (or other sources of power) are required to deliver streams of contaminant-free dry compressed gas for a variety of uses. Such compressors are typically rates up to 2 KW and deliver compressed gas at a pressure of up to 12 bar and at flow rate up to 5 scf/min. The compressed gas finds application, for example, in spray painting in small factories and vehicle repair, in supply of compressed gas for dentistry, in compressed air systems for hospitals and laboratories, and in the catering industry. The compressed gas may be contaminated with oil in the form of both mist and vapor and with water from the air. For efficient removal of oil mist, it is known that water needs to be removed first, because it will otherwise interfere with the action of the conventional oil-coalescing filter and oil-vapour removal cartridge variously described, for example in GB-A-1236396, GB-A-1557821, GB-A-1603519, U.S. Pat. No. 3,841,484 and EP-B-0081297. Water can be removed by passing the stream of compressed gas through a desiccant drier or a refrigerator drier. The former method involves regeneration or disposal of the desiccant medium, and the latter method requires disposal of relatively large volumes of contaminated liquid waster.

One such application for a compressor is in the supply of compressed air to a membrane air separation system which can deliver 99.5% pure nitrogen for mixing with carbon dioxide in the dispensing of beer in public houses. A system of this kind is sold by Calor Gas Limited, Air Separation Division, Slough, UK. The air fed to the membrane has to be clean, dry and contaminant free, otherwise the performance of the separator may be interfered with. However, about 300 ml of condensate is typically formed each day in the gas stream from the compressor, that condensate consisting mainly of water which is contaminated with particulate material and the product of wear to the compressor including bearing lubrication and/or oil if an oil lubricated compressor is used. This contaminated water or water-oil mixture usually cannot be disposed of as ordinary waste water because of increasingly strict environmental health regulations.

DISCLOSURE OF THE INVENTION

The invention is not, however, confined to relatively small compressors and can be used for medium sized or larger compressors.

Broadly stated, this invention avoids the need to deal with volume of waster watery liquid by feeding the compressed gas to a liquid separation chamber and continuously or intermittently discharging from a lower region of the chamber a compressed stream which is returned to atmospheric pressure and which carries the watery liquid in an atomised or vapor state. In this way, the need to provide a liquid drain valve at the base of the chamber can be avoided in many instances, or in some instances where there is a risk of liquid effluent collecting at the base of the chamber under some conditions, the frequency of use of the drain and the volume of aqueous liquid drained is reduced. Collection of condensate after evaporation has proved to be minimal or nil in practice. The re-expanded waste stream which is at ambient or below-ambient temperatures may be used to cool the incoming stream of compressed gas and promote liquid condensation therein. The removal of water from compressed gas does not require the supply of additional external power or coolant.

In one aspect the invention provides a method for treating a compressed gas stream to remove liquid effluent, comprising:

feeding the compressed gas stream to a chamber in which the effluent separates as liquid from the compressed gas;

recovering a treated stream of compressed gas from an upper region of the chamber, said treated stream having a reduced effluent content; and discharging a minor portion of the compressed gas (e.g. 10–30% of the compressed gas) as a waste stream rich in effluent from a lower region of the chamber so that liquid in the lower region of the chamber is swept out as part of the waste stream and does not form a body of liquid.

In the aforesaid method, the effluent may be a mixture of relatively volatile and relatively involatile liquids, and the waste stream may be fed to a second chamber from which the relatively volatile liquid passes as vapor e.g. from a discharge port at an upper region of the second chamber, and in which any relatively involatile liquid collects as liquid at the base of the second chamber, from which it may be removed periodically. The effluent is a mixture of water and oil or grease, especially where the stream of gas is compressed air from an oil-lubricated compressor but is generally only water from an oil-free compressor. In the case of the former, the water component of the liquid contaminant in the gas stream predominates, the relatively large volumes of water are discharged as vapour from the second chamber, and only the relatively small proportion of relatively involatile oil/grease contaminant, mainly used for packing, remains in the second chamber and presents a less demanding disposal problem.

Advantageously, the waste stream is discharged through a pressure-reducing valve or any other means which will allow the rapid expansion of gas from the pressurized state of atmospheric pressure e.g. an orifice plate or a length of fine bore tubing, on passage through which contaminant in liquid form becomes atomized and at least the volatile component thereof such as water easily re-volatizes. Preferably gas at an elevated temperature flowing to the first chamber is cooled by the effluent stream from the valve, the second chamber containing within it a heat exchanger structure for this purpose.

The gas may be compressed by a compressor and in that case is preferably air-cooled on its way to the first chamber. The compressor used as source of the compressed air may be a reciprocating compressor, an oil-lubricated rotary compressor, an oil-free compressor (e.g. the 517 compressor made by Thomas Industries Inc) or a screw compressor. It may feed air at 1–15 bar, typically 6–12 bar, although there is no particular upper limit on pressure. Flow rates may be up to 5 scfm, and although up to 120 scfm is envisioned as viable, the point is progressively reached where a refrigerator drier becomes a practical alternative. The first chamber may be empty or it may contain a liquid-coalescing or other filter through which the compressed gas passes. Where the compressor is oil-lubricated, the filter in the first chamber can be a particle filter to protect the pressure-reducing or needle valve through which the waste stream is discharged, e.g. the filter can be a 10 micron polyester filter. Depending on the fineness of the valve, the filter could be one micron or 0.1 micron filter. For an oil lubricated compressor, the filter after this can be a full flow-oil coalescing filter with the option of a carbon filter depending on the quality of air required.

The invention further comprises a method for treating a compressed gas stream to remove liquid effluent, comprising:

- feeding the compressed gas stream to a chamber at which the compressed gas becomes separated from the effluent;
- recovering a reduced effluent stream of compressed gas from an upper region of the chamber; and
- discharging the effluent from a base region of the chamber in a waste stream containing the effluent as vapour in a minor portion of the compressed gas.

The aforesaid method may further comprise the steps of passing the stream of compressed gas from the upper region of the chamber to an oil-coalescing filter and optionally through a cartridge containing an absorbent for an oil vapor.

The invention further provides apparatus for treating a compressed gas stream to remove liquid effluent, comprising:

- means for feeding the compressed gas stream to a chamber in which the effluent separates as liquid from the compressed gas;
- means for leading from an upper region of the chamber for recovering a treated stream of compressed gas, said treated stream having a reduced effluent content; and
- means for leading from a lower region of the chamber for discharging a minor portion of the compressed gas as a waste stream rich in effluent so that liquid in the lower region of the chamber is swept out as part of the waste stream and does not form a body of liquid.

Where the effluent is a mixture of relatively volatile and relatively involatile liquids such as water and lubricating oil, preferably a waste stream discharge line leads to a second chamber from which the relatively volatile liquid passes as vapor and in which any relatively involatile liquid collects as liquid. As previously stated, the waste stream may be discharged through a pressure-reducing valve, liquid effluent passing through that valve becoming atomized and returning into vapor.

In a further aspect, the invention provides an apparatus for cooling a warm stream of compressed gas from a compressor or other source, including valve means for permitting a portion of the stream to expand and means for feeding back the expanded gas back in heat-exchange relationship with the incoming gas.

In a yet further aspect, the invention provides apparatus for treating a compressed gas stream from a compressor to remove aqueous liquid from the stream, wherein a portion of the stream carrying condensed aqueous liquid is expanded through a valve to produce a waste stream in which the aqueous liquid has evaporated.

The invention also provides apparatus for providing a supply of compressed air, comprising:

- compressor means arranged to compress air and provide an output stream at an elevated temperature containing water vapor and contaminants from the compressor;
- cooling means arranged to cool the compressed air stream to near or below ambient temperatures;
- cleaning means that receives the compressed air from the cooling means and is arranged to separate liquid water and contaminants from the compressed air and provide an output stream of relatively clear air and a waste stream of air carrying liquid water and contaminants; and
- flow restriction means through which the waste stream from the cleaning means is discharged to atmosphere, said flow restriction means being arranged to direct the emergent waste stream which has become cooled on expansion to atmospheric pressure onto a portion of the output stream defining a heat-exchanger so that the emergent waste stream is warmed and water which has become atomized on emergence from the flow restriction means recondenses to a negligible extent.

The invention also provides a method for providing a supply of compressed air, including the steps of:

- compressing air by means of a compressor to provide a compressed air stream of an elevated temperature containing water vapor and contaminants from the compressor;
- cooling the compressed air stream to near or below ambient temperatures;
- passing the cooled compressed air stream to a cleaner at which the compressed air stream becomes divided into an output stream of relatively clean air and a waste stream of air carrying liquid water and contaminants; and
- discharging the waste stream to atmosphere through flow restriction means from which a discharged waste stream which cools in emergence from the flow restriction means is directed so as to exchange heat with the compressed air stream along a part of its travel from the compressed air stream along a part of its travel from the compressor to the cleaner and becomes warmed so that water which becomes atomised on emergence from the flow restriction means does not recondense.

BRIEF DESCRIPTION OF THE DRAWINGS

Various embodiments of the invention will now be described by way of example only with reference to the accompanying drawings, in which.

BEST MODE FOR CARRYING OUT THE INVENTION

Figure 1:
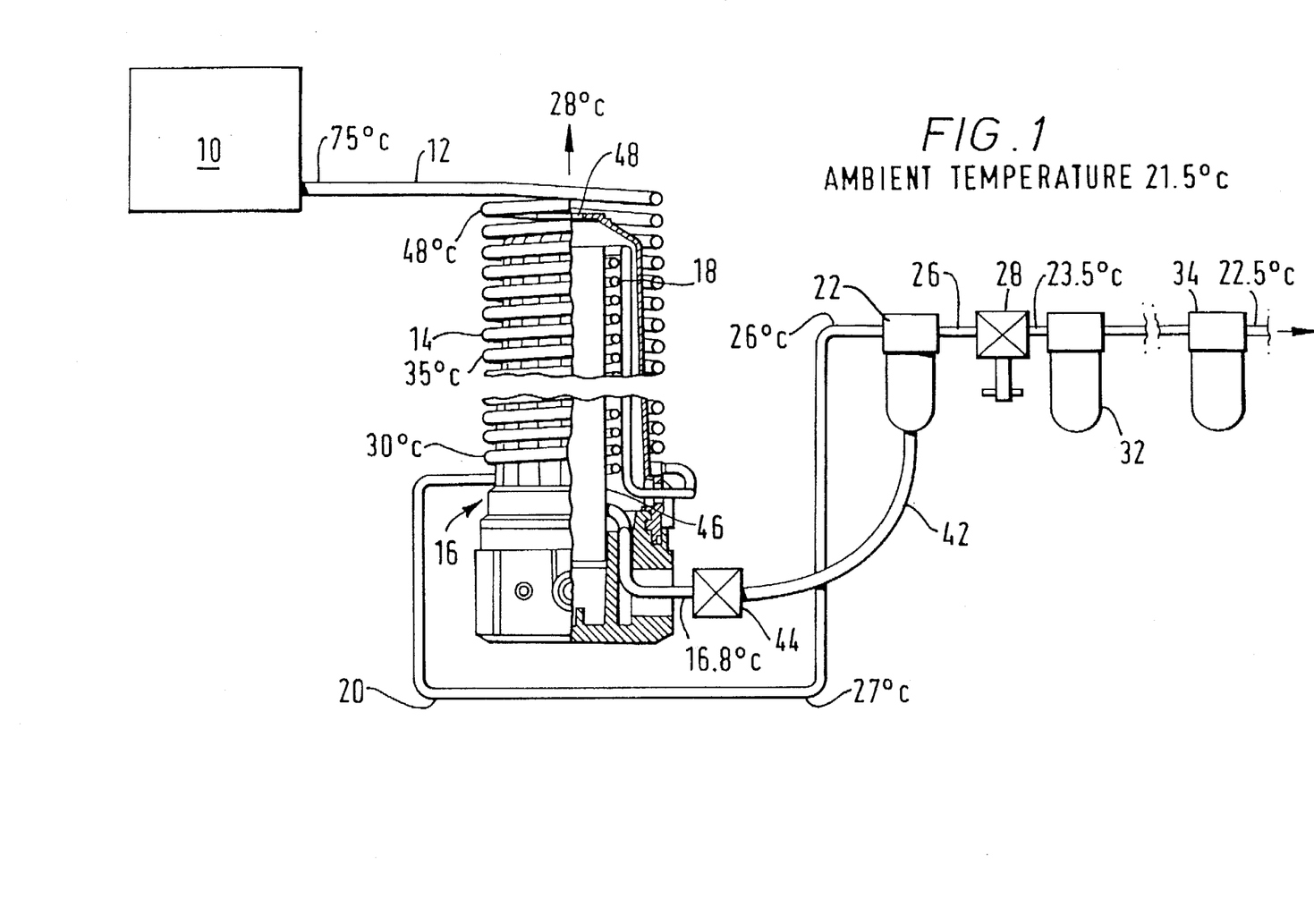
FIG. 1 shows diagrammatically a cooling and filter arrangement for use with an oil-lubricated air compressor.

In FIG. 1, an oil-lubricated air compressor 10 feeds compressed air through line 12 to an air cooling coil 14 which may be a narrow bore corrosion resistant tubing, typically plastics, stainless steel or copper tubing and which surrounds a chamber generally indicated as 16. Gas passing through the coil 16 is cooled by convective contact with the ambient air. The chamber 16 may be made of metal and may comprise a base unit and removable upstanding hollow body. Gas from the first cooling coil 14 enters the interior of the chamber 16 through which it passes via a second cooling coil 18, also of narrow bore copper tube, which is in convective contact with the air in the interior of chamber 16 which is at or below ambient temperatures as explained below. The gas from the compressor 10 is contaminated with water which condenses as it cools from its elevated temperature adjacent to the outlet to the compressor, and the bulk of the water, together with some of the oil from the compressor when an oil-lubricated compressor is used, is believed to liquify during passage through the coils 14,18. The coils 14,18 to opposite sides of the housing wall are thermally isolated from one another by a layer of insulation (not shown) which can be on the inside or on the outside of the housing, with a layer of plastics or metal material providing containment for the insulation medium between the wall of the housing and the adjacent coil. The insulation may be 506 grade microfiber as supplied by Evanite, Oregon, USA. Heat is lost from the coil 14 by conduction and radiation, but flow of heat in to the chamber 16 should be minimized because the interior of the chamber 16 is maintained at below ambient temperatures, and the expanded gas from valve 44 as described below is the only source of cooling gas for doing so. The gas from coil 18 passes through line 20 to a first separator chamber 22 in which there is preferably present a particle filter typically having an in-to-out flow direction and an efficiency of between 99.9999% against 0.12 micron particles and 96% against 0.3 micron particles. A water-reduced stream passes via line 26 from an upper region of the chamber 22 and thence via a reducing valve or pressure regulator 28 to filter holders 32,34. When a compressor runs hot and delivers compressed gas at well above ambient temperatures, e.g. as in the present case where a Hydrovane 5 PU compressor typically delivers air at 75° C. at the compressor outlet, it has been found that after the cooling unit 14,16,18 it is desirable to regulate the gas pressure, typically reducing it from 9 bar to 6 bar, so that the gas stream is not saturated and moisture does not condense. This pressure reduction was carried out at the regulator 28. The pressure reduction dries the air and prevents further water condensation provided that the ambient temperature does not change significantly.

The upstream filter holder 32 typically contains a coalescing filter having an in-to-out flow direction and less than 0.001 mg/m$^3$ carryover. The gas stream which is at 22.5° C. and may then be used directly or, depending on the quality required it may be further treated in holder 34 with an activated carbon filter for oil vapor removal as described in EP-B-0081297.

A contaminant flow line 42 leads part of the flow of compressed gas, together with any liquid contaminants, from the base of the chamber 22 via a reducing or needle valve 44 to the interior space of the chamber 16, where the gas which is now at ambient pressure passes up the outside of riser pipe 46 which terminates below the top of the chamber 16 as shown. The gas then passes up between the insulation material and the riser pipe 46 and cools the gas passing through inner coils 18. The gas from the compressor 10 at a line pressure of 9 bar or above and initially at 75° C. cools rapidly in coil 14 to about 30° C., the temperatures being as shown in the locations indicated and measured at an ambient or room temperature of 21.5° C., and further cools to about 27° C. as it enters line 20. The delivered gas flow rate is in this instance 45 l/min and the by-pass flow of 30 l/min after passage through valve 44 has cooled by expansion to 16.8° C. as it enters the interior of chamber 46 which is therefore at a temperature below ambient temperatures. In the interior of that chamber, heat exchange takes place between the cooled effluent-containing gas and the gas passing through coils 18. Water which was present in the first chamber 22 is atomized on passage through valve 44 or other means of controlling or restricting flow to permit a pressure drop, e.g. an orifice plate or length of fine bore tube and evaporates, so that the gas stream emerging through port 48 at the top of the chamber 16 is free of liquid. Most of the oil carried with the gas stream recondenses or is trapped as liquid within chamber 16 and gathers as droplets or a small pool,, and the rising stream of air through port 48 which has become warmed through heat exchange with gas in coil 18 is free of noticeable oil vapor and is almost odor-free also. Whether the oil condenses or is deposited in liquid form will depend upon the volatility of the oil, the power (energy) which determines exit velocity, the amount of free space for the air to expand into and hence the available free air to carry the atomized droplets away without subsequent restriction, and the temperature and pressure of the ambient air.

Figure 2:
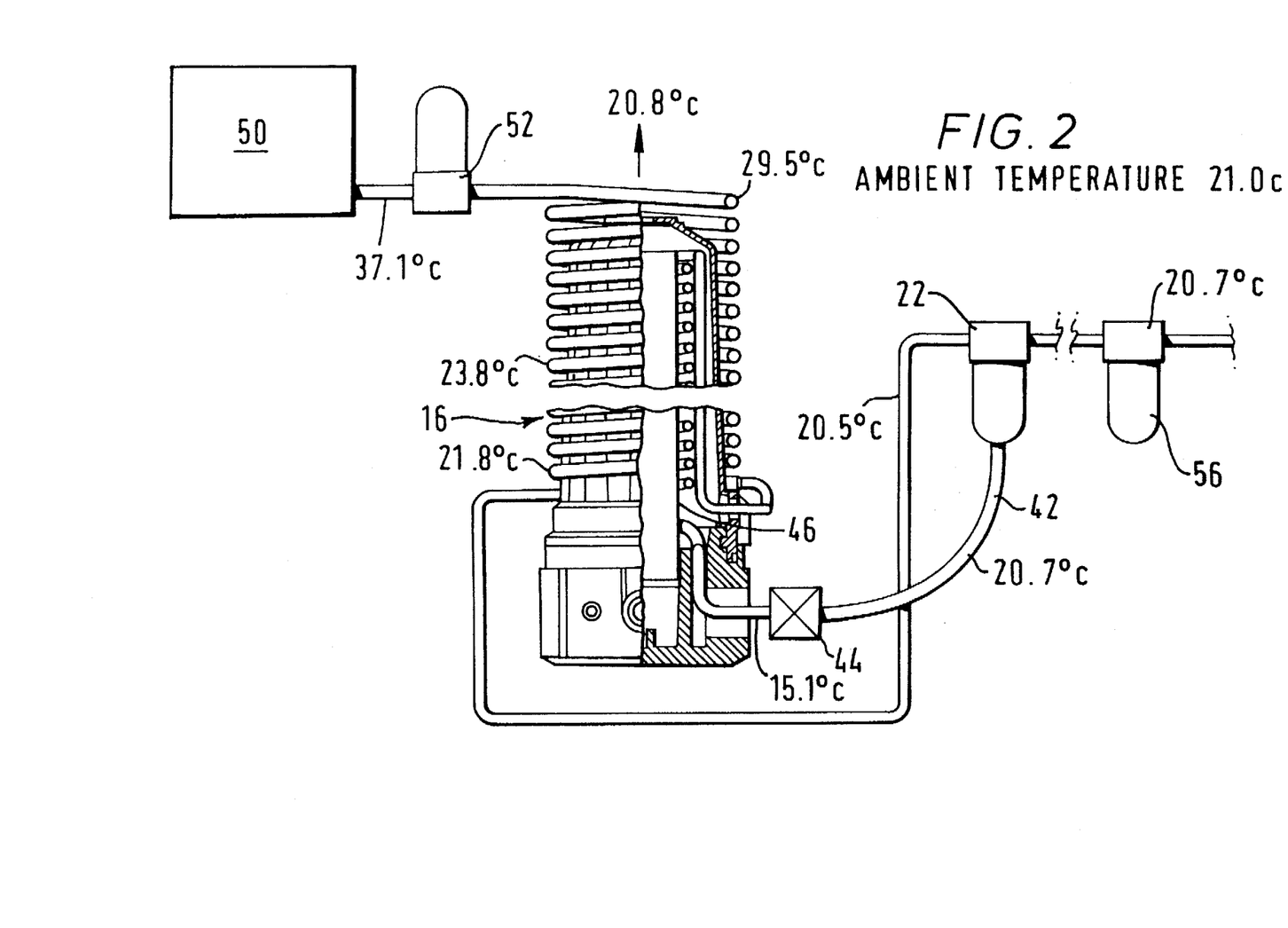
FIG. 2 shows diagrammatically a cooling and filter arrangement for use with an oil-free compressor.

The arrangement of FIG. 2 is similar except that a filter chamber 52 for solid particles is situated immediately downstream of the oil-free compressor 50. The filter chamber 52 typically contains a full flow filter having a 0.1 to 1.0 micron absolute cut off. The chamber 22 contains a particle filter typically having an out-to-in flow direction and 0.01 to 0.1 microns cut off. In the exemplified embodiment, the gas stream passes, without any flow restrictor, to a single further filter chamber 56 containing an activated carbon filter (see EP-B-0081297). The temperatures under steady state conditions had the indicated values at the indicated location, the measurement being made at a room temperature of 21° C. An oil-free compressor 50 available from Thomas Industries Inc operates at 12 bar and typically delivers 2 m$^3$ of air per hour. The temperature at the outlet of the compressor is typically about 35° C. Regulation of the gas pressure downstream of the cooling unit 14,16,18 has not been found desirable from the standpoint of the air quality after the cooler, but there is a tendency for the water effluent to evaporate incompletely, so that drainage of water from the chamber 22 (through a drainage valve is required) may under some conditions prove necessary. The interior of chamber 16 is cooled to below ambient temperature by gas at 15.1° C. which has expanded through the valve 44. Gas leaves the chamber 56 at 20.7° C. which is slightly below ambient temperature.

Figure 3:
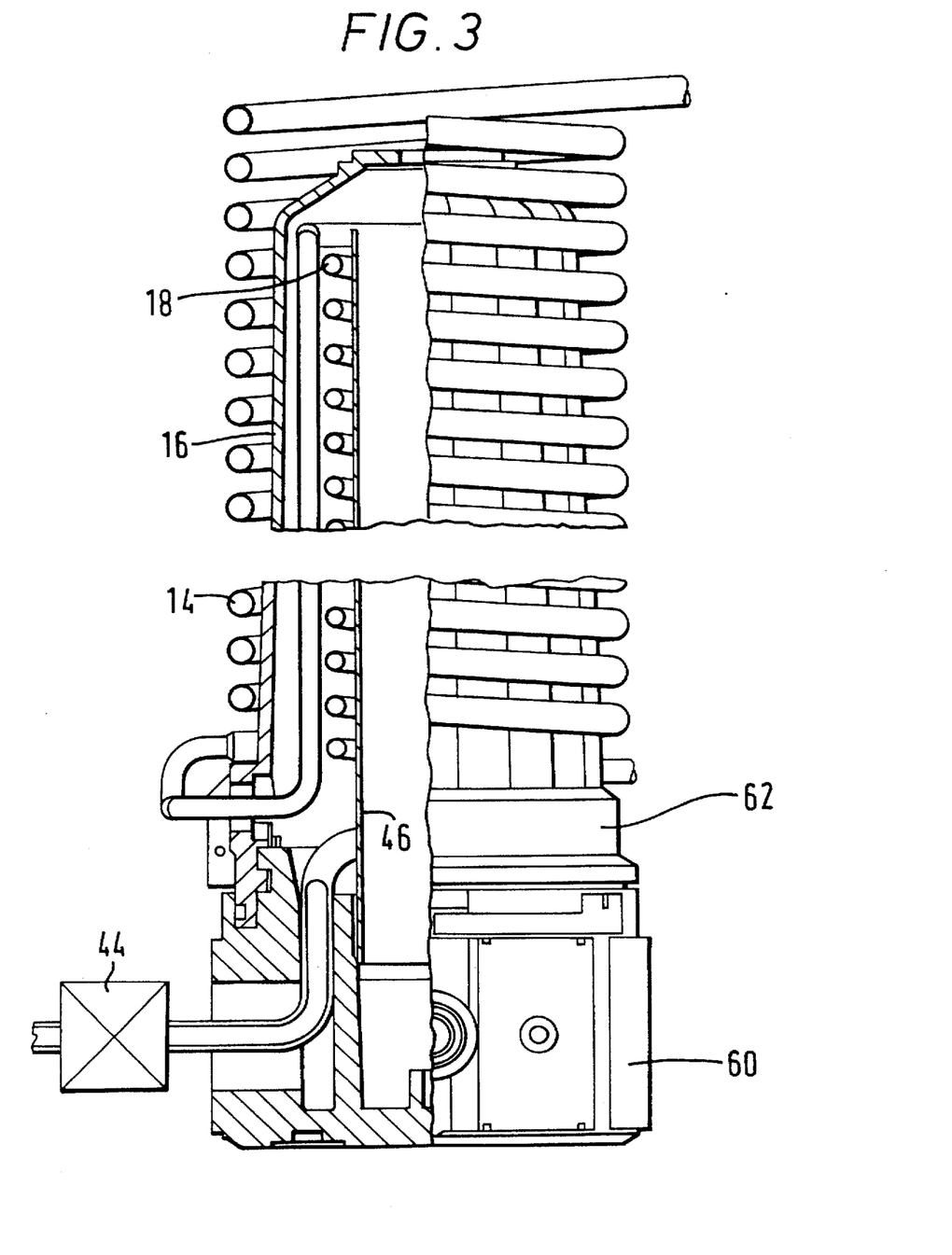
FIG. 3 is a more detailed view, half in section, of a cooler and heat-exchanger unit forming part of the apparatus of FIGS. 1 AND 2.

The chamber 16 and cooling coils 14,18 are shown in FIG. 3 on an enlarged scale and are based on an inverted filter head and bowl structure, the head appearing at 60 and the removable bowl appearing at 62. This structure has been used for experiments, but it will be appreciated that many other structures will achieve the same effects. Furthermore, liquid cooling e.g. in water baths may, if desired, be substituted in whole or in part for the air cooling of the illustrated embodiments.

The method of restriction to atomize the effluent and create the cooling effect prior to entry into coil space on the inside of the housing 16 does not necessarily have to be by a valve or needle valve. Instead, flow restriction can be an orifice or a tube which is substantially less in diameter than the tube 42 carrying the effluent from the first separation chamber 22. We have found that a plastic tube of 0.73 mm to be suitable for this propose, preferably varying in length from 1 cm to 15 cms.

Figure 4:
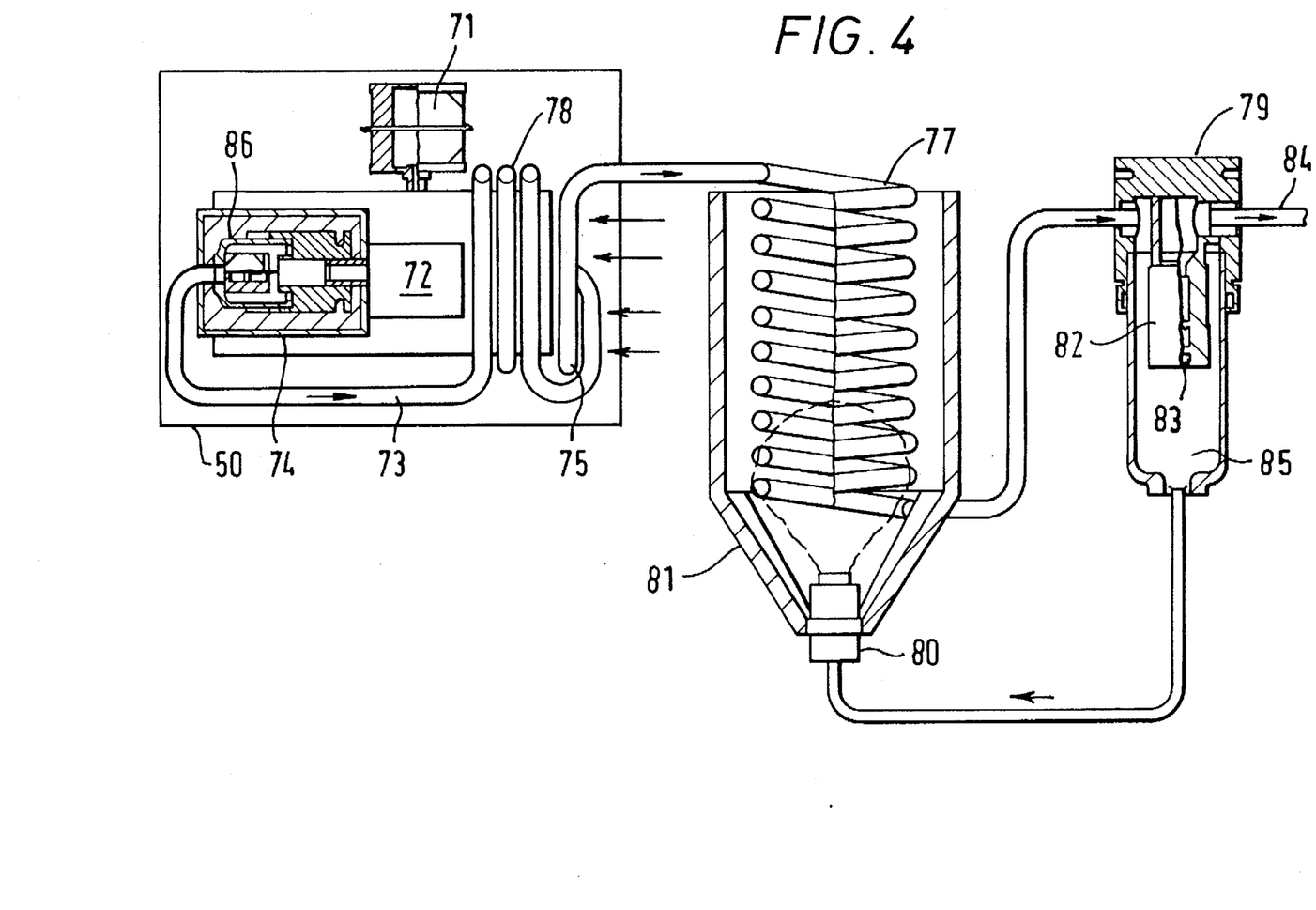
FIGS. 4 and 5 show alternative arrangements for supply of compressed air using a compressor of larger size.

FIG. 4 shows a preferred system for use with a Thomas 517 two-stage air compressor which is a machine of somewhat larger size than the compressors used in the earlier described embodiments. The compressor unit has an external housing which is generally indicated at 50, in which air enters the compressor through an intake filter 71 having a cut-off of about 0.15 um. The filter is based on a pleated medium having a pre-filter wrapped around it of 17 um nominal cut-off. It has been found that such a pre-filter and high efficiency particulate filter significantly reduces the dust which would otherwise enter the compressor and give rise to problems such as bearing overheating and blocked orifices and valves. The compressor contains a second stage compression chamber diagrammatically represented by the reference numeral 72 from which air passes through a hot gas filter 74 into a pipeline 73 which is of a corrosion resistant material, preferably stainless steel. The filter 74 is located immediately at the discharge end of the second stage compression chamber 72 and is arranged to receive the whole gas stream at a temperature in excess of 60° C. Under these conditions water droplets do not form and as a result there is no liquid present which would otherwise form a corrosive fluid by dissolving the products of compressor wear. The filter 74 has suitable insulation e.g. of fiberglass so that the gas stream does not become significantly cooled before it enters the pipeline 73.

Figure 6:
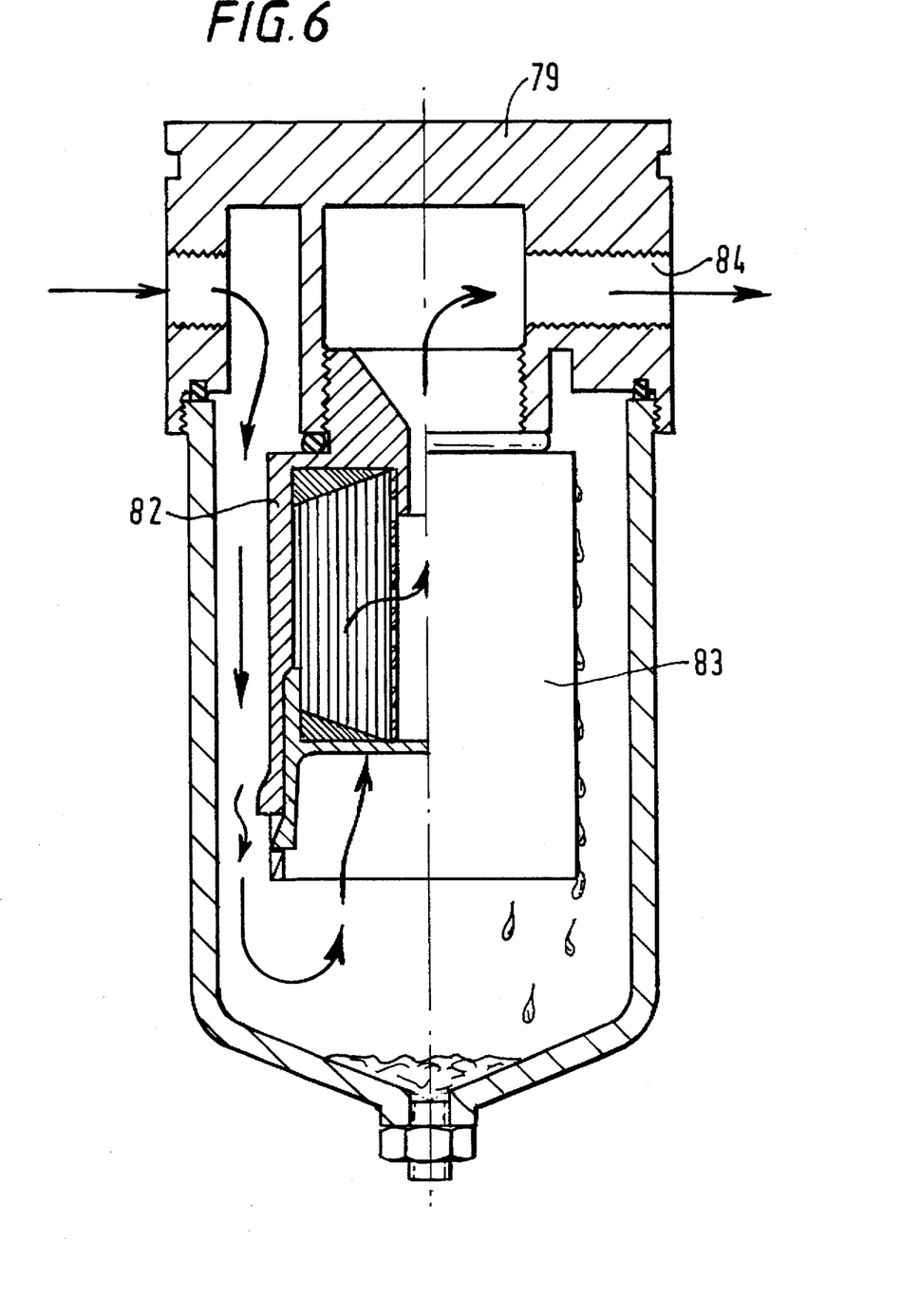
FIG. 6 is a diagrammatic view of one form of cleaning chamber forming part of the apparatus of FIG. 4.

In this embodiment the main cooling of the gas stream from the compressor takes place adjacent the compressor itself and within the external housing thereof. The pipeline 73 is formed with a first group of cooling coils 78 which surround one end of the compressor and a second group of spirally arranged coils 75 which are seen in end view in FIG. 4 and are located in the inlet draught of a cooling fan which forms part of the compressor. The air current which cools the compressor motor therefore strongly cools the air stream passing through the coil 75, the coils 78 cooling by natural convection. The pipeline 73 then passes outside the compressor housing 50 and leads to a vertical cooling coil 77 disposed within a canister 81 by which it is shrouded from the surround atmosphere. Further cooling takes place as will be described below, and the discharge end of the coil 77 leads to a filter chamber 79 containing a filter 83 shielded by a protective shield or baffle 82. The air enters the chamber 79 contaminated with water droplets containing dissolved oil or other contaminants and these are deflected from direct contact with the filter 83 by virtue of the shield or baffle 82 as best seen in FIG. 6. The air flow through the filter 83 is in an out-to-in direction as shown and the air enters the underside of the filter 83 through a small annular gap (not shown) in the base thereof. The filter 83 may employ a pleated or moulded glass filtration medium and typically has an efficiency of 99.9999% against 0.12 microns. The filter 83 is kept generally dry by the shield or baffle 82, and a stream of relatively pure dry compressed air flows out through line 84.

Water and other contaminants tend to collect in the base of the chamber 79 from which they are led with a small bleed of the air flow via a conduit to an orifice plate 80 which is located at the base of the canister 81. The discharged effluent from the orifice plate 80 is directed upwardly onto the helical coil 77 from which it picks up heat so that water which becomes atomized as the effluent leaves the plate 80 substantially does not recondense. The shroud 81 is designed to atomize the convective contact between the effluent and the coil 77. Any contaminants such as oil which are involatile may remain within the canister 81 but pass out of it only to a negligible extent.

Figure 5:
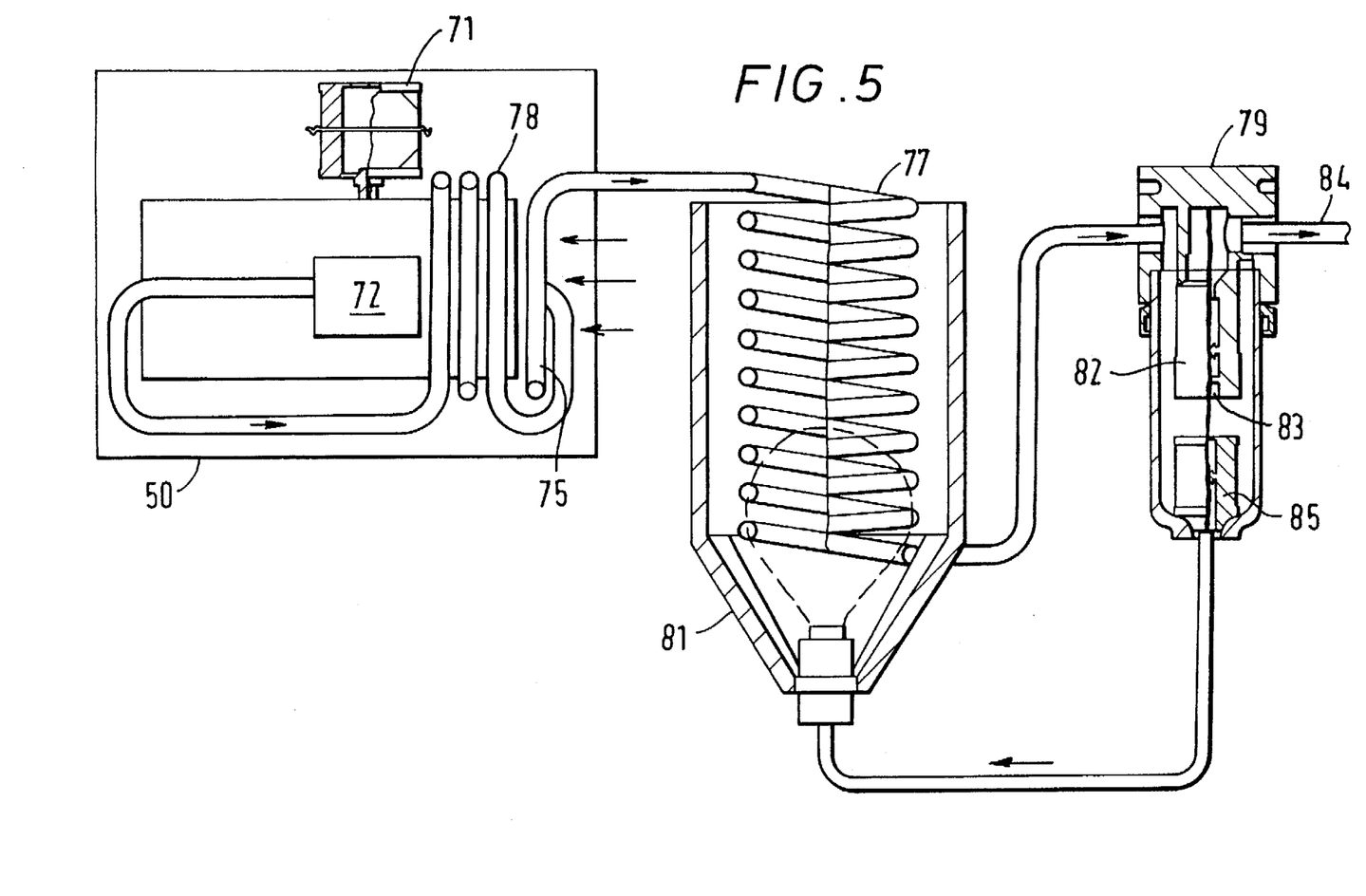

The arrangement of FIG. 5 is generally the same as that of FIG. 4, except that there is no in-line filter 74 and the chamber 72 is connected directly to the conduit 73. The filter chamber 79 has at its base a second in-line filter 85 for gas entering the flow restrive device 80. By this means, discharge of the products of wear of the compressor into the atmosphere is minimized.

We claim:

1. A method for providing a supply of compressed gas, comprising:

providing a compressed gas stream at an elevated temperature containing water vapor and other contaminants;

cooling the compressed gas stream to near or below ambient temperatures with the result that some of the water vapor within the gas stream condenses to form liquid water;

cleaning the compressed gas stream after cooling to separate the liquid water and the other contaminants from the compressed gas and to provide (a) an output stream of relatively clean gas, and (b) a waster stream of gas carrying the liquid water and the other contaminants; and permitting said waste stream to discharge to atmosphere through a flow restriction device, so that:

(i) the waste stream becomes cooled on expansion to atmospheric pressure and on atomization and evaporation of the liquid water; and (ii) the waste stream contacts a heat exchanger, used in said cooling step, and through which the compressed gas stream flows so that the discharged waste stream cools the compressed gas stream flowing through the heat exchanger.

2. The method according to claim 1, wherein the compressed gas stream is from an oil-lubricated compressor.

3. The method according to claim 1, wherein the compressed gas stream is from an oil-free compressor.

4. The method according to claim 2, wherein the output of the compressor is filtered to reduce contaminants entering the compressed gas stream.

5. The method according to claim 2, wherein the compressed gas stream is pre-cooled most of the way towards ambient temperature before it reaches the heat exchanger.

6. The method according to claim 1, wherein the heat-exchanger is shrouded from the ambient air.

7. The method according to claim 6, wherein the flow restriction device is disposed below the heat-exchanger and the flow restriction device discharges its emergent waste stream upwardly into contact with the heat-exchanger.

8. The method according to claim 7, which comprises shroud means wherein the other contaminants include relatively involatile liquids which collect at the base of said shroud means after exiting said flow restricting device.

9. The method according to claim 1, wherein the flow restriction device comprises one of a valve and an orifice plate.

10. The method according to claim 1, wherein a chamber having an inlet for the compressed gas stream, a first outlet for the output stream of relatively clean gas, a second outlet for the waste stream, filter means for filtering water droplets from the output stream, and a conduit leading from the second outlet to the flow restriction device is used to clean said compressed gas stream.

11. The method according to claim 10, wherein a baffle is used in the chamber for preventing impingement of water droplets in the compressed gas stream entering the chamber onto the filter.

12. The method according to claim 10, wherein the waste stream is filtered when exiting the chamber.

13. The method according to claim 1, wherein the waste stream is discharged to atmosphere continuously.

14. The method according to claim 1, wherein the waste stream is discharged to atmosphere intermittently.

15. Apparatus for providing a supply of compressed gas comprising:

a source of compressed gas for providing a compressed gas stream at an elevated temperature containing water vaporized and other contaminants;

a cooler for cooling the compressed gas stream to near or below ambient temperature such that some of the water vapor within the gas stream condenses to form liquid water, said cooler comprising:

(i) a housing having a wall defining an interior space of the housing, arranged such that an interior space of the housing is in communication with the atmosphere and a flow restricting inlet to said interior space; and (ii) a heat exchanger positioned within the interior space of said housing, said heat exchanger having an inlet for receiving the stream of compressed gas containing water vapor and other contaminants, an outlet for outputting the stream of compressed gas and liquid water and other contaminants and a heat exchanging conduit, located between said heat exchanger inlet and outlet, through which said compressed gas stream and contaminants flow and to which heat contained in the compressed gas stream passes;

a closed hollow filter chamber having an inlet for the compressed gas stream from said cooler, a first outlet for providing an output stream of relatively clean gas, a second outlet for providing a waste stream of gas carrying the liquid water and the other contaminants and a filter for filtering water droplets from the output stream; and a conduit connecting said second outlet of said filter chamber with said flow restricting inlet of said housing.

16. The apparatus according to claim 15, wherein the source of compressed gas comprises an oil-lubricated compressor.

17. The apparatus according to claim 15, wherein the source of compressed gas comprises an oil-free compressor.

18. The apparatus according to claims 16 or 17, which comprises a filter provided between the compressor and the heat exchanger, said filter reducing contaminants entering the heat exchanger.

19. The apparatus according to claim 18, which comprises a pre-cooler through which the compressed gas stream is arranged to pass before reaching the heat exchanger and which is arranged to cool the gas most of the way towards ambient temperature.

20. The apparatus according to claims 16 or 17, which comprises a pre-cooler through which the compressed gas stream is arranged to pass before reaching the heat exchanger and which is arranged to cool the gas most of the way towards ambient temperature.

21. The apparatus according to claim 20, wherein the pre-cooler is disposed so as to surround the heat-exchanger.

22. The apparatus according to claim 20, wherein the pre-cooler is located in proximity with the compressor.

23. The apparatus according to claim 15, wherein the wall of said housing is provided for shielding the heat-exchanger from the ambient air.

24. The apparatus according to claim 15, wherein the flow restriction mechanism is disposed below the heat-exchanger and the flow restriction mechanism discharges an emergent waste stream therefrom upwardly into contact with the heat-exchanger.

25. The apparatus according to claim 24, wherein said other contaminants include relatively involute liquids which collect at the base of said housing after exiting said flow restriction inlet.

26. The apparatus according to claim 15, wherein the flow restriction inlet comprises one of a valve and an orifice plate.

27. The apparatus according to claim 15, which comprises a baffle preventing impingement of water droplets in the compressed gas stream from entering the filter chamber onto the filter.

28. The apparatus according to claim 15, which comprises a second filter provided at the second outlet of the filter chamber, said second filter reducing contamination of the waste stream.

29. The apparatus according to claim 15, wherein the waste stream is discharged continuously from the second outlet of the filter chamber.

30. The apparatus to claim 15, wherein the waste stream is discharged intermittently from the second outlet of the filter chamber.

31. Apparatus for providing a supply of compressed gas, comprising:

a mechanism providing a compressed gas stream at an elevated temperature containing water vapor and other contaminants;

a cooling mechanism cooling the compressed gas stream to near or below ambient temperature such that some of the water vapor within the gas stream condenses to form liquid water, said cooling mechanism comprising:

(i) a housing having a wall defining an interior space of the housing, arranged such that the interior space is in communication with the atmosphere, and a flow restricting inlet to said interior space; and (ii) a heat exchanger positioned within the interior space of said housing, having an inlet receiving the stream of compressed gas containing water vapor and other contaminants, an outlet outputting the stream of compressed gas and liquid water and other contaminants and a heat exchanging conduit, located between said heat exchanger inlet and outlet, through which said compressed gas stream and contaminants flow and to which heat contained in the compressed gas stream passes;

a closed hollow filter chamber having an inlet for the compressed gas stream from said cooling mechanism, a first outlet providing an output stream of relatively clean gas, a liquid water and the other contaminants and a filter filtering water droplets from the output stream; and a conduit connecting said second outlet of said filter chamber with said flow restricting inlet of said housing.

* * * * *

UNITED STATES PATENT AND TRADEMARK OFFICE
CERTIFICATE OF CORRECTION

PATENT NO. : 5,732,766
DATED : March 31, 1998
INVENTOR(S) : George S. HUNTER et al It is certified that error appears in the above-identified patent and that said Letters Patent is hereby corrected as shown below:

Column 8, line 23, change "waster" to --waste--.

Column 9, line 11, change "vaporized" to --vapor--.

Column 10, line 27, after "apparatus" insert --according--.

Signed and Sealed this

Seventh Day of July, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,732,766
DATED : March 31, 1998
INVENTOR(S) : George S. HUNTER, et al.

It is certified that error appears in the above-identified patent and that said Letters Patent is hereby corrected as shown below:

On the title page item [87], the PCT Publication Date Should be:

--September 30, 1993--

Signed and Sealed this

Sixth Day of October, 1998

Attest:

BRUCE LEHMAN

Attesting Officer

Commissioner of Patents and Trademarks